(12) United States Patent
Salinas et al.

(10) Patent No.: US 12,231,560 B2
(45) Date of Patent: *Feb. 18, 2025

(54) SCRAMBLING DATA FOR USE WITH VEHICLE COMMUNICATION PROTOCOL

(71) Applicant: The Heil Co., Chattanooga, TN (US)

(72) Inventors: Ricardo Castano Salinas, Fort Payne, AL (US); John Forrest Smith, Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,606

(22) Filed: Apr. 6, 2023

(65) Prior Publication Data

US 2023/0246833 A1 Aug. 3, 2023

Related U.S. Application Data

(63) Continuation of application No. 17/063,125, filed on Oct. 5, 2020, now Pat. No. 11,626,987, which is a
(Continued)

(51) Int. Cl.
| | |
|---|---|
| *H04L 9/16* | (2006.01) |
| *B65F 3/00* | (2006.01) |
| *H04L 9/08* | (2006.01) |
| *H04L 9/40* | (2022.01) |
| *H04L 12/40* | (2006.01) |
| *H04W 4/48* | (2018.01) |
| *H04L 67/12* | (2022.01) |

(52) U.S. Cl.
CPC .............. *H04L 9/16* (2013.01); *B65F 3/00* (2013.01); *H04L 9/0891* (2013.01); *H04L 12/40* (2013.01); *H04L 63/00* (2013.01); *H04L 63/0428* (2013.01); *H04L 63/068* (2013.01); *H04W 4/48* (2018.02); *H04L 2012/40215* (2013.01); *H04L 2012/40273* (2013.01); *H04L 67/12* (2013.01)

(58) Field of Classification Search
None
See application file for complete search history.

(56) References Cited

U.S. PATENT DOCUMENTS

| | | |
|---|---|---|
| 7,831,363 B2 | 11/2010 | Quigley |
| 8,751,098 B2 | 6/2014 | Faus et al. |

(Continued)

OTHER PUBLICATIONS

[No Author Listed], "Q&A—What is SAE J1939?" Axiomatic Global Electronic Solutions, Jul. 2006, 3 pages.
(Continued)

*Primary Examiner* — Brandon Hoffman
(74) *Attorney, Agent, or Firm* — Fish & Richardson P.C.

(57) ABSTRACT

A scrambling method of data on a J1939 communication system of a vehicle involves at least moving data from one of a PGN and a PGN/SPN location to another PGN or PGN/SPN location at a first controller on the vehicle before transmitting data and then re-ordering the data at a second controller. Some embodiments further comprise encrypting data either before or after shifting, but before transmitting so as to further complicate efforts to interpret meaningful data from the transmission. The second controller may be on the vehicle or may be remotely located.

20 Claims, 2 Drawing Sheets

Related U.S. Application Data continuation of application No. 16/288,275, filed on Feb. 28, 2019, now Pat. No. 10,797,875, which is a continuation of application No. 15/297,659, filed on Oct. 19, 2016, now Pat. No. 10,256,969.

(60) Provisional application No. 62/245,673, filed on Oct. 23, 2015.

(56) References Cited

U.S. PATENT DOCUMENTS

| | | |
|---|---|---|
| 10,256,969 B1 | 4/2019 | Salinas et al. |
| 10,797,875 B2 | 10/2020 | Salinas et al. |
| 11,626,987 B2 | 4/2023 | Salinas et al. |
| 2009/0169007 A1 | 7/2009 | Vasicheck |
| 2015/0086016 A1* | 3/2015 | Oshida ................ H04L 9/3236 |
| | | 380/255 |
| 2015/0137993 A1 | 5/2015 | Terry |
| 2019/0356488 A1 | 11/2019 | Salinas et al. |
| 2021/0234685 A1 | 7/2021 | Salinas et al. |

OTHER PUBLICATIONS

[No Author Listed], "SGJ Cable Actuated Sensor SAE J1939 CANBus Output Signal," TE Connectivity, Dec. 2015, 6 pages.
Murvay et al., "Security shortcomings and countermeasures for the SAE J1939 commercial vehicle bus protocol," IEEE Transactions on Vehicular Technology, May 2018, 67(5):4325-4339.
Thomson, "Thomson Electrak® Throttle: Electric Linear Actuator," Installation Manual, Edition Jan. 2016, Jan. 2016, 16 pages.

* cited by examiner

SCRAMBLING DATA FOR USE WITH VEHICLE COMMUNICATION PROTOCOL

CLAIM OF PRIORITY

This application is a continuation of U.S. patent application Ser. No. 17/063,125 filed Oct. 5, 2020, now U.S. Pat. No. 11,626,987, which is a continuation of U.S. patent application Ser. No. 16/288,275 filed Feb. 28, 2019, now U.S. Pat. No. 10,797,875, which is a continuation of U.S. patent application Ser. No. 15/297,659 filed Oct. 19, 2016, now U.S. Pat. No. 10,256,969, which claims the benefit of U.S. Provisional Patent Application No. 62/245,673 filed Oct. 23, 2015, all of which are incorporated by reference herein in their entirety.

FIELD OF THE INVENTION

The present invention relates to the protection of data through encryption and shifting while complying with communication protocols such as the SAE J1939 Communication Protocol or the CANopen Protocols communication systems.

BACKGROUND OF THE INVENTION

The SAE J1939 Communication Protocol has been in existence for a number of years in the United States. Vehicle manufacturers such as those that make chassis for refuse vehicles and others use Parameter Group Numbers (PGNs) which are each associated with eight bytes of data which are normally broken into a suspect parameter number groups (SPNs). Maps are provided by that industry standard provider to identify which set of numbers corresponds to particular sets of information relative to the vehicle.

For hypothetical example purposes only, Parameter Group No. 1234 could be associated with engine information such as RPM, oil pressure, and oil temperature, broken up into values within the eight bytes of data associated with that PGN as SPNs at specific locations in that order of eight bytes. Within the J1939 communication protocol, there are standard PGNs and proprietary PGNs. The standard PGNs range from 000000 to 00FEFF. The proprietary PGNs range from 00FF00 to 00FFFF.

For CANopen communications, there are certainly profiles which can be adopted (or not) by various users such as a garbage truck profile for assigning various IDs to data.

These IDs have bytes of data associated therewith. What if a particular manufacturer wanted to attempt to make it very difficult for competitors to copy or utilize their data? For instance, some companies would prefer to make their data incompatible with replacement parts provided by other manufacturers.

The applicant is unaware of any current techniques utilized in the automotive communications industry for intentionally making communication protocol data extremely difficult to decipher. Today one could simply look at data in the proprietary use PGNs and implement a change in the body (i.e., move the arm control joystick, extend the grabber arm, dump a can, etc.) and watch the SPNs change associated with those PGNs. Unassigned or unused PGNs would not likely have SPNs changing values during such operation.

Accordingly, a perceived need for making data as used across vehicle communication networks difficult to reverse engineer so as to be able to make replacement components, sensors or compatible modules which may be inferior in quality to those provided by the applicant.

SUMMARY OF THE INVENTION

It is a present object of many embodiments of the present invention to provide a system and method for securely utilizing at least a portion of a communications protocol such as the SAE J1939 Communication Protocol or the CANopen Protocols or other protocols in which ID numbers or PGNs are assigned for particular sets of values such as SPNs or other data relating at least to operations associated with the body of the vehicle (as opposed to the chassis). A chassis is a large truck provided by one of various manufacturers. A body is the garbage processing portion of the vehicle. The compactor, the storage bin, the lifting arms, etc.

The applicant has identified a number of these for uses with respect to the body of a refuse vehicle such as to identify data related to when a refuse can is dumped into the body or when an arm is extended, a joy stick moved, or for other purposes which can then be sent as information possibly along with other information in the J1939 communication protocol or otherwise for various uses such as to a controller or even to an OBD-2 port directly or indirectly for use with remote software. These proprietary use PGNs are not assigned but are merely available for various parties to use as they see fit. A co-filed application of the applicant is addressing community body information (not just chassis information) through the J1939 protocol.

Not only can data in these protocols be encrypted, but data can also be shifted amongst SPNs and/or even from portions of SPNs across various PGNs in accordance with an algorithm so as to make identification of specific data elements extremely difficult for a competitor to identify and/or decode. Also, by inserting phantom data into unused PGN and/or SPN numbers, even further difficulty can be created when encrypting and/or shifting values at these locations. The shifting and/or encrypting steps (together referred to as scrambling) can change every single interval of sent data, the frequency of which could happen at 100 milliseconds or less. When "scrambled" information is received by an intended target, it can then be un-shifted (back to specific PGN and SPN locations) and possibly decoded by a processor. This could include received data at a remote location, or if scrambling portions occur at components in the body of a vehicle or elsewhere, at one or more controllers on the vehicle itself for use by the vehicle.

Accordingly, information relative to a refuse vehicle or other applications such as, but not limited to, relating to when and where a particular event occurred, can be communicated in a secure manner. Specifically, for one particular event related to refuse vehicles, like dumping of a garbage can, a timestamp of when the event occurred and a GPS location corresponding to that timestamp could simultaneously be provided through the communications network (such as the J1939) and/or other network(s).

Information from technology like an RFID (radio frequency identification) tag, which could be unique to a particular can being dumped, could be communicated through PGN/SPN combinations of the J1939 protocol or others, to provide a plethora of information to a controller at the vehicle and/or a remote location. It would be possible to use at least some scrambled data in an unscrambled manner on technology like the RFID tag, so that if competitors attempt to reverse engineer which data is being sent and what the values of that sent data correlate to, in an effort to provide a replacement part or unit, or even a competitive product, the competitor would be at a significant disadvantage when looking at the data transmitted in an effort to decipher it.

Not only can relevant data bytes be encrypted and shifted to be scrambled relative to the positions where they might be expected, additional "trash" data bytes could be encrypted and/or shifted amongst any or some of the proprietary PGNs. This could further complicate the efforts of a competitor in deciphering what data bytes, values, and locations might be relevant or not.

The shifting of data can take on many forms and be performed through a simple or complicated algorithm as would be understood by those of ordinary skill in the art. Furthermore, even if the shifting algorithm could somehow be decoded, one would still need one or more particular keys to decipher encoded text within each of the relevant communication blocks. Those keys could change, perhaps on a relatively frequent basis which could further complicate the efforts of one attempting to dissect particular information, if one begins this process without knowing the relevant algorithm or keys. Similarly, the algorithm could also change, perhaps periodically and/or based on events or other situations.

While the complexity of this scrambling protocol is probably not as complex as the Enigma machine used by the Germans in World War II, it is unlikely that the applicant's competitors would undergo the expense of time and computing capabilities likely required in an effort to decipher the underlying information. Thus, the applicant believes they provided a very effective method of scrambling data, in an effort to make it extremely difficult for competitors to reverse engineer and provide replacement components that could be inferior, unsuitable, or even incompatible for use with the applicant's equipment.

BRIEF DESCRIPTION OF THE DRAWINGS

The particular features and advantages of the invention will become apparent from the following description, when read with the accompanying drawings.

DETAILED DESCRIPTION OF THE PREFERRED EMBODIMENT

Figure 1:
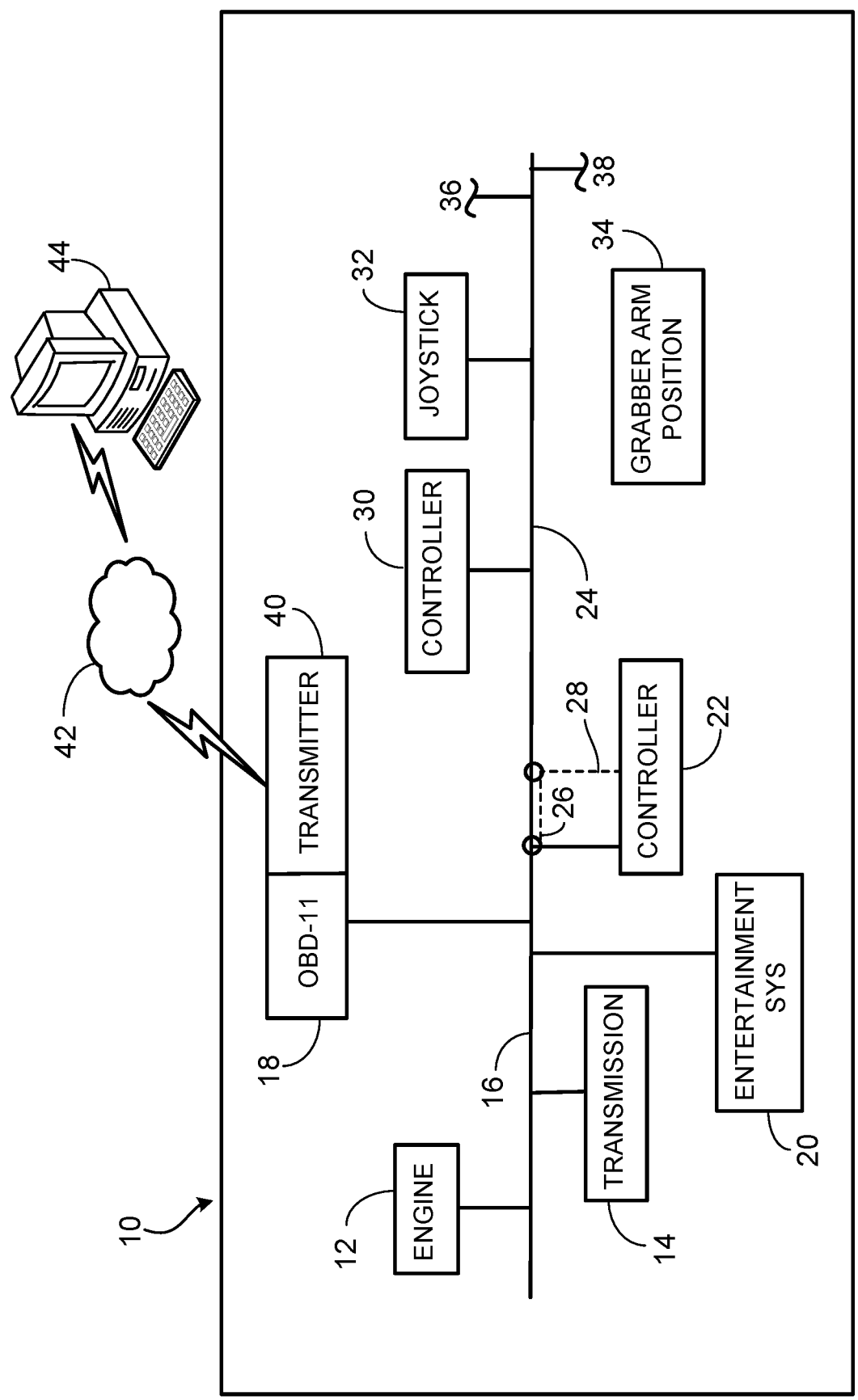
FIG. 1 is a diagram representing a vehicle of the presently preferred embodiment of the present invention communicating remotely with a computer.

FIG. 1 shows a vehicle 10 of the presently preferred embodiment of the present invention operating with a J1939 protocol for communication system. The engine 12 which has transmission 14 communicating along a communication wire 16 with the OBD 2 port 18, entertainment system 20 and other components of a truck chassis. Furthermore, a controller 22 for use with the body on the vehicle which is the part which coordinates the refuse receiving and collection and compacting is shown communication with the same 1939 communication wire 24 which could be connected at connection 26 or through a separate communication system which could be connected at first controller 22 at connection 28 depending on which embodiment is selected. A separate or second controller 30 might be useful for some embodiments.

Joy stick 32 such as for operating the can dumping arm or grabber arm shown as well as a position sensor for the grabber arm 34 is shown. Other connections such as status of compaction could be provided at the various connection locations 36, 38, etc., connected to communication wires 24 and/or others as would be understood by those of ordinary skill in the art. The OBD 2 port 18 can communicate through transmitter 40 such as a Geotab device which can communicate not only data from the OBD 2 port and possibly other data as could be directly provided through one or more IO ports, directly connected to the transmitter or otherwise through the internet 42 such as using cell phone frequencies to get to the internet, etc., as would be understood by those of ordinary skill in the art to one or more computers 44 which could have route optimization software or other software for use in the data provided from the vehicle 10. Computer(s) 44 receive data as sent by transmitter, and with unscrambled data, provide information to users as described herein, possible in at least near to, if not real time (as it is happening).

What is different about this vehicle 10 from prior art vehicles is that the data provided from the OBD 2 port and even on the at least one of the communication wires 16 includes "scrambled" data. Other embodiments may scramble the data with a transmitter 40 or components such as joy stick 32 or other components rather than using a separate controller such as 22 and/or 30.

While providing information from the body, such as from joy stick 32 and grabber arm 34 on a J1939 communication protocol is believed to be novel as covered by a co-pending application being directed to that effort, what is also novel is the ability to scramble information as it is sent across the J1939 network and from the OBD 2 port 18 remotely as well as possibly within the vehicle 10 itself.

Specifically, a first controller 22 may receive information from the various body components such as controller 30, joy stick 32, grabber arm position sensor switch 34 and a host of other sensors associated with the refuse body. The controller 22 or even a second controller 30 if not performed by the various components such as joy stick 32, grabber arm position sensor switch 34 and others provide an ability to scramble data as will be discussed below.

Figure 2:
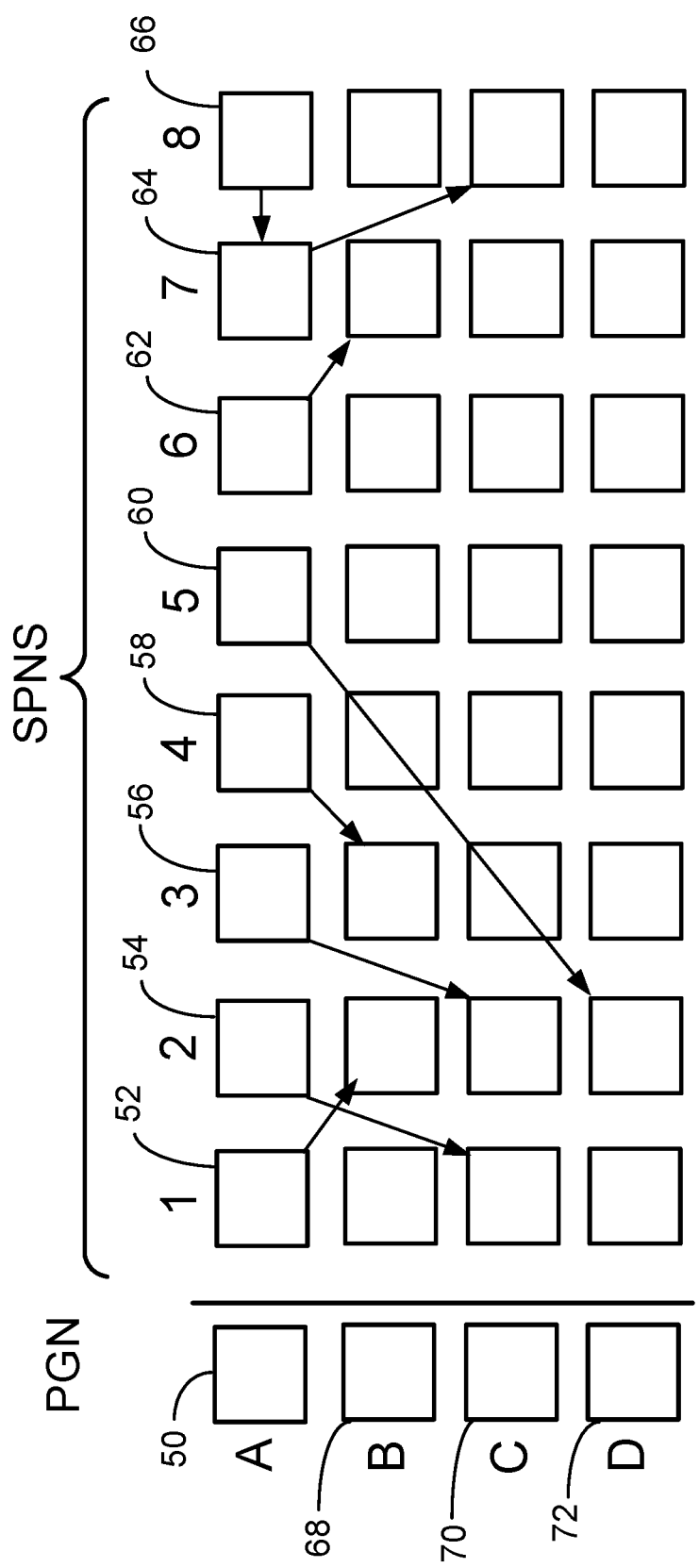
FIG. 2 is a diagram representing a communication system utilized by the embodiment of FIG. 1.

Specifically, the J1939 protocol has a number of PGNs, each of those PGNs have eight byte SPNs associated therewith. Although there are standard PGNs in the J1939 protocol, there are also PGNs assigned for proprietary use meaning that they can be used to communicate additional information. The applicant has artificially assigned the labels A, B, C, D, etc. to some of those proprietary PGNs. Each of these PGNs have SPNs and let us assume that PGNs A, B, C, D and possibly others are utilized by the various controllers such as joy stick 32, grabber arm position sensor 34 and various others 36, 38 and possibly others. For instance, the joy stick 32 could be associated to PGN A and SPNs 1-4 could be associated with the X-position of moving the grabber arm, while SPNs 5-8 could be associated with the Y-position relative to an X-Y plane, with that plane being perpendicular to the ground that the vehicle is operating on. This is by way of example. There is certainly other data which could be obtained and provided from the various components of the body. In this example as well as FIG. 2, PGN A is shown as element 50 having SPNs 52, 54, 56, 58, 60, 62, 64, and 66. Each of the various components in the body of vehicle 10 that provide data on the proprietary set of PGNs A-D illustrated as 50, 68, 70, and 72 and other could be provided with relevant data each of which have corresponding SPNs such as SPNs 52-66 shown for PGN 50.

One way to scramble this data is to certainly encrypt all the data such as the PGNs 50, 68, 70, 72 as well as possibly the SPNs 52, 54, 56, 58, 60, 62, 64, 66 using key. While encryption is relatively well known in the art, if only some of the PGNs A-D and/or others of the hundreds of proprietary PGNs available are used, a competitor could quickly identify which PGNs are being utilized and which ones are not. The competitor could then take those utilized PGNs and provide reverse encoding software to attempt to decode the material therein. With enough time and effort, the keys could likely be deciphered.

However, in addition to encoding the various PGNs and SPNs 50-66 and 68-72 through encryption, the applicant has also come up with a method of shifting. For instance, of the SPNs and PGN 50 with a first portion of an SPN being located at position A-1 at 52, that value could be shifted to position B-2 or some other of the PGN and SPN positions or even to the PGN numbered positions such as PGN B at 68, 70, or 72 based on an algorithm. PGN at 50 could also be shifted to any of the various locations such as another one of the PGN locations B, C, and D, etc., as well as any of the SPN positions as so desired.

Remember, for the preferred embodiment these values are all encrypted. Furthermore, the controller such as controller 22, 30 or even the transmitter 40 or other component could also be providing "ghost data" in the various unused PGN and SPN numbers possibly all the time or even under certain conditions so that to a competitor all this material might be not only encrypted but also shifted and could appear to the competitor as an extremely random set of information.

For instance, SPN A-1 at 52 could be moved to a location where the PGNs are not normally of particular interest to the applicant. Also, some unused PGN/SPN filled in with various numbers and encrypted possibly with similar or dissimilar keys. The unscrambling process then becomes a very time intensive ordeal for a competitor. Not only does the shift pattern need to be identified which would be a challenging prospect, particularly if the shift pattern changes such as by having variables tied to time, or other elements within the system such as RPM provided from a PGN or SPN number from the engine 12 or also by possibly receiving input, such as if the transmitter 40 is capable of receiving signals from the internet 42 to be provided back through the OBD 2 port to the controller 22 or otherwise. The shift pattern or algorithm could also be changed in a similar or dissimilar manner either based on a fixed rotation such as a cycle rotation whether based on a number of cycles of use as a key or a period of time where it is based upon an instruction received at the controller 22 from another input. For some embodiments, the algorithm controlling the shift could be changed every cycle which is up to 100 milliseconds which would be extremely difficult for a competitor to discern particularly when taken with the encrypted data in each of the various SPNs utilizing key encryptions and/or ghost data input.

With encryption possibly occurring at first controller 22 as received from data from what might be a separate communications line 24 as connected at 28 (with 26 not being a connection) in such an embodiment, at least some of the data on the J1939 protocol is received from the body could be scrambled in nature as sent from the transmitter 40 through the internet 42 to a computer 44 for use which could have a reverse shift algorithm and a decode key so that the data appears as it is expected at the computer 44 for further processing (i.e., "unscrambled"). The computer 44 would have software and/or an application configured to receive the scrambled information, preferably together with unscrambled information, unscramble the scrambled information and provide unscrambled data for use in communicating events occurring at the remote location (a/k/a the vehicle 10). Controllers 22, 30 could have similar capabilities with various embodiments. Specifically, for example, the position of the joy stick 32 could then be readily identified by the software. Other events, such as when the compacting stage in the body of the vehicle 10 has been completed or a can dumped at a particular GPS location, etc., for various uses either remotely by a remote computer or by first or second controller 22, 30.

While the scrambling could be performed at a first controller 22, it is also possible that scrambling could occur at a second controller 30 and at least partially unscrambled at controller 22 so that values received from the various components such as joy stick 32, grabber arm 34 might be coordinated with other data from the vehicle 10 such as from the chassis. Otherwise, information from the chassis such as the engine RPM which might/is useful to know if it is coupled to a pump. A pump utilized for hydraulics is often directly tied to operation of some body components and information on the body can be communicated from the controller 22 to another controller 30 for use internal to the body itself for some embodiments. In a presently preferred embodiment, it is not anticipated to scramble any of the assigned PGN and SPN values as there is no reason to possibly interfere with the operation of the chassis as designed by a truck manufacturer. However, since the proprietary use PGNs do not have a normal use by the chassis manufacturer, the scrambling of those values and assignment of those values to anything really does not make much difference to the chassis operation. Of course, if a chassis manufacturer or other party elects to use some proprietary PGNs those can be omitted from the scrambling procedure as well.

What is really intended by the scrambling method is to be able to scramble data utilizing the shifting and encrypting techniques described herein, preferably within the proprietary PGN and SPN values data blocks in the communication protocol which are updated up to every 100 milliseconds and then unscrambling those data for use as desired at locations controlled by the applicant such as within the software maintained by the applicant remotely and possibly used under license by third parties (or sent to the applicant for processing) so that control of the data flow can be maintained by the applicant.

Not only can the controllers 22, 30, and 40 scramble data but also the joy stick 32, grabber arm 34, and other components provided at 36, 38 could provide scrambled information on to the communication wires 24 and/or 16 in various embodiments, particularly if the applicant were to provide the encoding keys and the shifting algorithm to the manufacturer of the joy stick 32 and the grabber arm sensor 34. This way, when listening to the various communication wires 24 to 16, there will be no unscrambled data relating the applicant's body of the vehicle 10 (apart from chassis information which is normally the tractor part of the refuse vehicle as obtained from third parties such as manufactures of vehicles for use with refuse bodies and others). Packer extension is often monitored; can dumping and more is also capable of being monitored.

While this technology is particularly well suited to the refuse vehicle industry, it also could be utilized with other vehicles as well as even non-vehicle applications. The applicant's sister company makes a line of compactors which are provided at various locations by their customers such as for compacting cardboard or trash on location. These compactors could be provided with a similar or different communications portal(s); they could also be provided with a transmitter such as transmitter 40, and various sensors such as sensors 36, 38 which could be monitoring the remaining compactor capacity, or when a certain weight has been reached, or more; such an event could be identified by either the software at the computer 44 or a signal could be sent from the transmitter 40 from a controller 22 and/or 30.

By scrambling at least some of the data as sent from the transmitter 40, as well as possibly sending meaningless transmissions periodically, it would be particularly difficult for a competitor to identify what sensors provide what information to the refuse collection company and software 44. In the CANopen protocols, there may be more flexibility in what information is scrambled. Certainly not all the information in CANopen or all of the J1939 need to be scrambled for all embodiments and certainly, for at least some embodiments, additional PGNs or IDs numbered for CANopen network could be provided with values that change, but are "ghost values"; this would mean that they really are not relative to any measurements or any activity going on at the vehicle 10 but are merely introduced into the communications system randomly, under certain conditions, etc., and may not even be used and/or evaluated by the controllers 22, 30 or the transmitter 40 in data as sent remotely to the computer 44 or as is used internal to the vehicle.

This data could be transmitted with some embodiments by the transmitter 40 as that set of different data stream. If intercepted by a competitor and looked at in an effort to analyze the data exiting OBD 2 port 18, there would be a lot of scrambled data to examine, some or much of which could be useless. The scrambling of data may take place within only the PGNs that correspond to specific sensors with SPN values such as 32,34,36, and/or may be purposefully scrambled to other PGNs or other proprietary use subsets, or not. With the PGNs unscrambled, then unshifted and unencrypted, the data can be useful by the computer 44 and/or even internally to the vehicle 10.

For many embodiments, it could be desirable to change the algorithm with every single transmission of data from transmitter 40 which could occur roughly every 100 milliseconds and the processors utilized with today's technology can certainly handle that speed of computing. With the shifting changing and possibly being performed in combination with the keys changing at that speed and/or at other cycles, one can truly see the potential complexity of the scrambling techniques as it could be employed at least in certain embodiments.

The software installed at the computer 44 for many embodiments which is configured to receive scrambled data through the internet 42 from the transmitter 40 which receives and unscrambles that data for use by software in the computer 44 for use in advising the company owning the computer of the status of components the body of vehicle as it relates to at least some of the scrambled data such as the dumping of the garbage can, possibly as correlated to one of GPS position and/or time at the computer 44 relative to the vehicle 10. Meanwhile, in such embodiments, if one were to insert a computer at the OBD 2 port 18, one would discover scrambled data which preferably is both encrypted and shifted in position at least among the affected PGNs and SPNs if not amongst some of the other proprietary use PGNs and SPNs not used by the particular body associated with the vehicle 10 for certain operations such as not pertaining to the operation of the refuse vehicle functions associated with the collection and compacting and dumping of waste by the vehicle 10.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A refuse collection vehicle, comprising:
   a chassis supporting a refuse service body;
   a communications bus configured to transmit data according to a J1939 transmission protocol comprising a plurality of Parameter Group Numbers (PGNs); and
   a controller communicatively coupled to the communications bus, the controller configured to:
   receive data corresponding to an operation of the refuse service body, the received data having a first PGN assignment;
   process the received data to shift data from the first PGN assignment to a second PGN assignment; and
   direct the processed data through the communications bus via the J1939 transmission protocol according to the second PGN assignment.

2. The refuse collection vehicle of claim 1, wherein the received data comprises eight bytes in a first order, the eight bytes having the first PGN assignment.

3. The refuse collection vehicle of claim 2, wherein the controller is configured to process the received data to rearrange the eight bytes into a second order.

4. The refuse collection vehicle of claim 3, further comprising a second controller communicatively coupled to the communications bus, the second controller configured to receive and process the data having the second order of the eight bytes and the second PGN assignment to shift and rearrange the eight bytes back to the first order and the first PGN assignment.

5. The refuse collection vehicle of claim 1, wherein the refuse service body comprises a grabber arm and a sensor responsive to a position of the grabber arm, and wherein the data corresponding to operation of the refuse service body comprises output from the sensor.

6. The refuse collection vehicle of claim 5, wherein the refuse service body further comprises an arm control joystick, and wherein the data corresponding to operation of the refuse service body comprises output from the arm control joystick.

7. The refuse collection vehicle of claim 5, wherein the data corresponding to operation of the refuse service body comprises information scanned from an RFID tag associated with a refuse can engaged by the grabber arm.

8. The refuse collection vehicle of claim 1, wherein the controller is further configured to receive data corresponding to operation of the chassis and associate chassis data with service body data as event data, and wherein processing the received data comprises processing the event data.

9. The refuse collection vehicle of claim 8, wherein the event data further comprises a time stamp and location data.

10. The refuse collection vehicle of claim 1, wherein the communications bus comprises a CAN protocol bus.

11. The refuse collection vehicle of claim 1, wherein the controller is further configured to inject ghost values into the received data.

12. The refuse collection vehicle of claim 1, wherein the controller is configured to change a shift pattern for processing the received data as a function of time.

13. The refuse collection vehicle of claim 1, further comprising a transmitter configured to receive the processed data over the communications bus and transmit the data over a wireless network to a remote computing device.

14. The refuse collection vehicle of claim 1, wherein the controller is configured to direct the processed data to an OBD II port.

15. A refuse collection vehicle, comprising:
a chassis supporting a refuse service body;
a CAN bus configured to transmit data according to a J1939 transmission protocol comprising a plurality of Parameter Group Numbers (PGNs);
a controller communicatively coupled to the CAN bus, the controller configured to:
receive data corresponding to an operation of the refuse service body, the received data having a first PGN assignment;
process the received data to shift data from the first PGN assignment to a second PGN assignment;
direct the processed data through the CAN bus via the J1939 transmission protocol according to the second PGN assignment; and
a transmitter configured to receive the processed data over the CAN bus and transmit the data over a wireless network to a remote computing device.

16. The refuse collection vehicle of claim 15, wherein the refuse service body comprises a grabber arm and a sensor responsive to a position of the grabber arm, and wherein the data corresponding to operation of the refuse service body comprises output from the sensor.

17. The refuse collection vehicle of claim 15, wherein the controller is further configured to receive data corresponding to operation of the chassis and associate chassis data with service body data as event data, and wherein processing the received data comprises processing the event data.

18. The refuse collection vehicle of claim 17, wherein the controller is configured to change a shift pattern for processing the received data as a function of time.

19. The refuse collection vehicle of claim 15, wherein the received data comprises eight bytes in a first order, the eight bytes having the first PGN assignment.

20. The refuse collection vehicle of claim 19, wherein the controller is configured to process the received data to rearrange the eight bytes into a second order.

* * * * *